(12) United States Patent
Hanratty

(10) Patent No.: US 12,025,163 B2
(45) Date of Patent: Jul. 2, 2024

(54) FASTENER COMPRISING A BLIND RIVET ELEMENT AND A SEALING ELEMENT

(71) Applicant: BBA S.r.l., Centobuchi di Monteprandone (IT)

(72) Inventor: Paul Hanratty, Southampton (GB)

(73) Assignee: BBA S.r.l., Centobuchi di Monteprandone (IT)

( * ) Notice: Subject to any disclaimer, the term of this patent is extended or adjusted under 35 U.S.C. 154(b) by 169 days.

(21) Appl. No.: 17/168,563

(22) Filed: Feb. 5, 2021

(65) Prior Publication Data

US 2021/0246927 A1    Aug. 12, 2021

(30) Foreign Application Priority Data

Feb. 6, 2020 (EP) ...................... 20155830

(51) Int. Cl.
  *F16B 19/10* (2006.01)
(52) U.S. Cl.
  CPC ................ *F16B 19/1036* (2013.01)
(58) Field of Classification Search
  CPC . F16B 19/1036; F16B 37/067; F16B 19/1072
  USPC ............................................. 411/34, 37, 38
  See application file for complete search history.

(56) References Cited

U.S. PATENT DOCUMENTS

| | | | | |
|---|---|---|---|---|
| 3,136,203 A * | 6/1964 | Davis | ............... | F16B 19/1072 |
| | | | | 29/524.1 |
| 5,569,005 A | 10/1996 | Millington | | |
| 6,487,767 B1 * | 12/2002 | Reid | ................. | F16B 19/1072 |
| | | | | 29/243.529 |
| 7,641,430 B2 * | 1/2010 | Johnson | ............... | B23P 9/025 |
| | | | | 411/113 |

(Continued)

FOREIGN PATENT DOCUMENTS

| | | |
|---|---|---|
| DE | 103 42 316 A1 | 4/2005 |
| DE | 10 2012 015 144 A1 | 3/2013 |

(Continued)

OTHER PUBLICATIONS

Europäisches Patentamt (European Patent Office), Europäischer Recherchenbericht (European Research Report), dated Jul. 17, 2020, 2 pages, European Patent Office, München, Germany (DE).

*Primary Examiner* — Sarang Afzali
*Assistant Examiner* — Darrell C Ford
(74) *Attorney, Agent, or Firm* — CHRISTOPHER C. DREMANN, P.C.; Christopher C. Dremann

(57) ABSTRACT

A fastening means having a blind rivet element and a sealing element, wherein the blind rivet element has a head portion and a shaft adjoining the head portion in an axial direction, wherein the shaft has an internal thread or a connecting portion for a threaded bolt and, between the internal thread or the connecting portion for the threaded bolt and the head portion, a deformation portion for forming a closing head when the deformation portion is deformed. The sealing (Continued)

element has a closed lateral portion and a closed cover portion adjoining the lateral portion in the axial direction, wherein the lateral portion circumferentially encloses the shaft of the blind rivet element at least in the region of the deformation portion, and the cover portion is formed at an end of the shaft of the blind rivet element facing away from the head portion.

18 Claims, 4 Drawing Sheets

(56) References Cited

U.S. PATENT DOCUMENTS

| | | | | |
|---|---|---|---|---|
| 8,057,144 B2* | 11/2011 | Johnson | ............ | F16B 19/1072 411/372.5 |
| 8,403,007 B1* | 3/2013 | Marinelli | ............ | F16L 55/168 29/402.02 |
| 2004/0218990 A1* | 11/2004 | Stevenson | ............ | F16B 3/005 411/82 |
| 2005/0019136 A1* | 1/2005 | Jones | ............ | F16B 19/008 411/501 |
| 2006/0045649 A1* | 3/2006 | Johnson | ............ | F16B 5/04 411/38 |
| 2006/0078399 A1* | 4/2006 | Coddington | ........ | F16B 19/1054 411/38 |
| 2008/0016667 A1* | 1/2008 | Lanni | ............ | B21J 15/025 29/240.5 |
| 2009/0061187 A1* | 3/2009 | Wang | ............ | B21J 15/027 428/457 |
| 2013/0177364 A1* | 7/2013 | Orlando | ............ | F16B 19/1054 411/542 |
| 2015/0117981 A1 | 4/2015 | Spongk | | |
| 2019/0154073 A1* | 5/2019 | Figge | ............ | F16B 5/0258 |
| 2022/0290712 A1* | 9/2022 | Kuntze | ............ | F16B 37/067 |

FOREIGN PATENT DOCUMENTS

| | | |
|---|---|---|
| DE | 10 2011 119 819 A1 | 6/2013 |
| DE | 10 2012 000 547 A1 | 7/2013 |
| EP | 1 918 596 A1 | 5/2008 |
| JP | H07 12613 U | 3/1995 |
| JP | H11 37118 A | 2/1999 |

* cited by examiner

FASTENER COMPRISING A BLIND RIVET ELEMENT AND A SEALING ELEMENT

FIELD OF THE INVENTION

The present invention relates to a fastening means having a blind rivet element and a sealing element.

BACKGROUND OF THE INVENTION AND RELATED ART

Blind rivet elements have proven to be effective for fastening tasks in which a screw connection is required in the region of thin-walled materials, for example sheet metals, into which a thread cannot usually be cut. A blind rivet element is known for example from EP 1 918 596 A1.

DE 10 2012 015 144 A1 also discloses a fastening means having a blind rivet element and a sealing element, wherein the blind rivet element is configured in the form of a blind rivet nut having a head portion and a shaft adjoining the head portion in an axial direction. Bearing against the blind rivet nut is a sealing element which is intended to prevent the ingress of moisture into the receiving opening of a component made of carbon fiber-reinforced plastic, the blind rivet nut being inserted into said receiving opening. The sealing element makes it possible to protect the receiving opening against the ingress of moisture, for instance by spray water.

OBJECT AND SUMMARY OF THE INVENTION

It is an object of the present invention to further develop a fastening means, which has a blind rivet element, in such a way that a flow of fluid and/or flow of heat from a first side of a component, into which the fastening means is introduced, to a second side of the component, said second side being opposite the first side, and vice versa, is avoided in the region of the fastening means.

Said object is achieved by way of a fastening means having the features shown and described herein.

The fastening means has a blind rivet element and a sealing element, wherein the blind rivet element has a head portion and a shaft adjoining the head portion in an axial direction Z. The shaft has an internal thread or a connecting portion for a threaded bolt and, between the internal thread or the connecting portion for the threaded bolt and the head portion, a deformation portion. The deformation portion is used to form a closing head when the deformation portion is deformed. The sealing element has a closed lateral portion and a closed cover portion adjoining the lateral portion in the axial direction, wherein the lateral portion circumferentially encloses the shaft of the blind rivet element at least in the region of the deformation portion, and the cover portion is formed at an end of the shaft of the blind rivet element, said end facing away from the head portion.

The blind rivet element may be configured in the form of a blind rivet nut, inasmuch as the blind rivet element may be configured with an internal thread in the region of the shaft. A fastening means, which has a blind rivet element in the form of a blind rivet nut, in this respect has a blind rivet element with an internal thread, can be connected to a component such that the fastening means is initially positioned in a prefabricated hole or in a prefabricated receiving opening of the component and is then riveted using a suitable tool, which typically has a rotatable and axially displaceable threaded mandrel. For this purpose, the threaded mandrel is screwed into the internal thread of the blind rivet nut from the head portion side and, upon abutment of the tool against the head portion, is then displaced axially such that the deformation portion is compressed and a counterpart flange, that is to say a closing head, is thus formed between the beginning of the thread and the bottom side of the component. The closing head, together with the head portion of the blind rivet nut, said head portion being arranged on the top side of the component, anchors the blind rivet nut and thus the fastening means in the component. The threaded mandrel is subsequently unscrewed and removed. The blind rivet nut is then available as a receptacle for a fastening screw. If the blind rivet element is configured in the form of a blind rivet threaded bolt, the shaft has a receptacle for a threaded bolt which, generally speaking, is welded to or compressed with the receptacle. The fastening means is connected to a blind rivet threaded bolt in a corresponding manner to the connection of the fastening means to a blind rivet nut, with the difference that tension is exerted directly on the threaded bolt.

Since the sealing element has a closed lateral portion and a closed cover portion, wherein the lateral portion circumferentially encloses the shaft of the blind rivet element at least in the region of the deformation portion, and the cover portion is formed at an end of the shaft of the blind rivet element, said end facing away from the head portion, the lateral portion of the sealing element, during the formation of the closing head, is deformed in a corresponding manner to the deformation of the deformation portion of the shaft and, after the blind rivet element has been set, encloses the closing head of the blind rivet element. The lateral portion of the sealing element, said portion being deformed in the region of the closing head and preferably being closed, thus typically comes to bear against the component on that side of said component which faces away from the head portion of the blind rivet element, and thus bears around the receiving opening, such that a flow of fluid—a flow of gas or liquid—from one side of the component to the other side of the component through the receiving opening, and vice versa, is avoided. Additional effects/advantages are the protection against particles such as dust or dirt which are entrained in the fluid, also that the sealing element/the head portion turns a blind rivet element with an open end into a blind rivet element with a closed end. The blind rivet element is therefore an inexpensive part which is simple to produce, with avoidance of the known inadequate surface coating of blind rivet elements having a closed end, in particular blind rivet nuts, in the case of which it is not possible to reach the lowest region of the blind rivet element/ of the blind rivet nut during the coating operation.

In addition, the blind rivet element, which is typically composed of a metal or a metal alloy, is also not exposed, or at least exposed to a lesser extent, to the atmosphere or the environmental conditions which prevail on that side of the component which is assigned to the closing head. By way of example, it would be conceivable that an atmosphere which would have a corrosive effect on the material of the blind rivet element or would promote corrosion of the material of the blind rivet element, for example an atmosphere with high humidity, or an atmosphere with metal-oxidizing substances, for example an acid, prevails on that side of the component which is assigned to the closing head. On account of this corrosion protection, it is possible for a blind rivet element/a blind rivet nut made of low-carbon steel (with or without a surface coating) to be used instead of a blind rivet element/a blind rivet nut made of stainless steel.

Direct contact between the closing head and that side of the component which faces the closing head is also avoided as a result of the sealing element. This is particularly advantageous with regard to the avoidance of galvanic corrosion, in particular if the blind rivet element and that side of the component which faces the closing head are composed of different metals or metal alloys.

The sealing element preferably bears against the shaft. In particular, the lateral portion of the sealing element bears against the shaft.

It is considered to be particularly advantageous if the sealing element is pot-shaped, in particular is configured in the form of a hollow cylinder which is closed on one side.

In a particularly preferred embodiment, a wall of the shaft in the region of the deformation portion has a weakening, for example in the form of holes, slots or perforations, for the purpose of forming the deformation portion.

It is considered to be particularly advantageous if, during the formation of the closing head, the lateral portion of the sealing element is deformed while maintaining the closed structure. In this case, it is entirely conceivable that the lateral portion, with reduction in the material thickness, follows the deformation of the deformation portion. Deformation with bead formation is also conceivable.

In a particularly preferred embodiment, the blind rivet element is manufactured from a metal or a metal alloy.

It is considered to be particularly advantageous if the sealing element is manufactured from a plastic, for example is manufactured from a polymer. The plastic is in particular polyester.

The material of the sealing element is in particular a non-conductive material. This is particularly advantageous with regard to the avoidance of galvanic corrosion.

The material of the sealing element is formed in particular in such a way that it can follow the deformation of the deformation portion, without resulting in fracture of the sealing element or formation of cracks therein.

It is considered to be particularly advantageous if the blind rivet element has a passage opening which passes through the blind rivet element in the axial direction.

In a preferred embodiment, the cover portion of the sealing element and that end of the shaft of the blind rivet element which faces away from the head portion are spaced apart from one another in the axial direction. This is particularly advantageous with regard to deformation of the lateral portion in the case of deformation of the deformation portion, since the distance makes it possible to reduce the axial extent of the sealing element without that end of the shaft which faces away from the head portion introducing a force onto the cover portion. Furthermore, the distance between the cover portion and that end of the shaft which faces away from the head portion is advantageous in that a setting mandrel, a screw or some other connecting means having a thread can be introduced into the blind rivet element in such a way that the setting mandrel, the screw or the other connecting means passes completely through the shaft, without the screw or the other connecting means acting on the cover portion of the sealing element. As a result, a situation is avoided whereby the cover portion is damaged or even destroyed during the introduction of the setting mandrel, the screw or the other connecting means into the blind rivet element.

The distance between the cover portion and the end of the shaft is preferably at least 1.0 times the pitch of the internal thread. In the present case, "pitch" is understood to mean the axial distance travelled in one turn, that is to say the distance between two thread crests. The distance is in particular at least 3.0 times, preferably 4.0 times, preferably 5.0 times, the pitch of the internal thread.

It is considered to be particularly advantageous if the distance between the cover portion and the end of the shaft is at least 20% of the length of the shaft.

It is considered to be particularly advantageous if the lateral portion extends up to the head portion. As a result, it is ensured that the sealing element is also arranged in the region of the passage opening of the component, as a result of which the sealing action is improved and direct contact between the component and the blind rivet element is avoided in said region.

In an advantageous embodiment, provision is made for the sealing element to have, preferably between the head portion and the deformation portion, in particular at that end of said sealing element which faces away from the cover portion, a circumferential projection which protrudes radially outwardly in relation to the lateral portion. With an introduction of force of the head portion during the setting of the blind rivet element, said radially outwardly protruding, circumferential projection is preferably pushed against the first component and clamped in between the head portion and the component, as a result of which a particularly good sealing action can be obtained.

In this context, it is considered to be particularly advantageous if the projection protrudes radially outwardly in relation to the head portion.

In an advantageous embodiment, the sealing element has a further lateral portion, wherein the further lateral portion circumferentially encloses the head portion of the blind rivet element.

A partial region of the further lateral portion preferably protrudes counter to the axial direction in relation to the head portion. Preferably, that partial region of the further lateral portion which protrudes counter to the axial direction is radially inwardly deformable such that said partial region radially inwardly covers the head portion in the axial direction after the deformation. The partial region can be deformed for example during the setting of the blind rivet element. However, it is also entirely conceivable for the partial region to be formed separately, for example prior to or after the setting of the blind rivet element. The forming is preferably effected by means of the setting tool which is to be used for forming the closing head.

In a preferred embodiment of the fastening means, provision is made for the sealing element and the blind rivet element to be connected to one another in a non-releasable manner. The sealing element and the blind rivet element are in particular connected to one another in a materially bonded manner, in particular are adhesively bonded to one another.

In another preferred embodiment of the fastening means, the sealing element is injection-molded onto the blind rivet element. As a result, the fastening means can be produced in a particularly simple and cost-effective manner.

In an alternative embodiment, the sealing element and the blind rivet element are connected to one another in a releasable manner. The sealing element and the blind rivet element are in particular connected to one another in a force-fitting manner. The blind rivet element is preferably pressed into the sealing element.

In a particularly preferred embodiment, the blind rivet element and the sealing element form separate components. This has an advantageous effect on the warehousing, since a separate blind rivet element, which can in principle also be used without a sealing element, finds use, as required, together with the sealing element. It is entirely conceivable that a separate blind rivet element is pressed, as required, into a separate sealing element for the purposes of forming the fastening means and, after being pressed in, the blind rivet element and the sealing element are handled together. However, it is also conceivable that the sealing element is initially introduced into the passage opening of the component and the blind rivet element is subsequently inserted into the sealing element, and the fastening means is formed in this way.

The sealing element is preferably manufactured from a polymer, in particular manufactured from a thermoplastic polymer.

It is considered to be particularly advantageous if the blind rivet element is manufactured from a metal or a metal alloy and the sealing element is manufactured from a plastic, in particular a polymer, preferably polystyrene.

The sealing element is preferably of one-part configuration.

The blind rivet element is preferably of one-part configuration.

BRIEF DESCRIPTION OF THE DRAWING FIGURES

The invention is described in more detail on the basis of exemplary embodiments and illustrated by the following drawing figures, without being restricted to said embodiments.

DESCRIPTION OF EXEMPLARY EMBODIMENTS OF THE INVENTION

Figure 1:
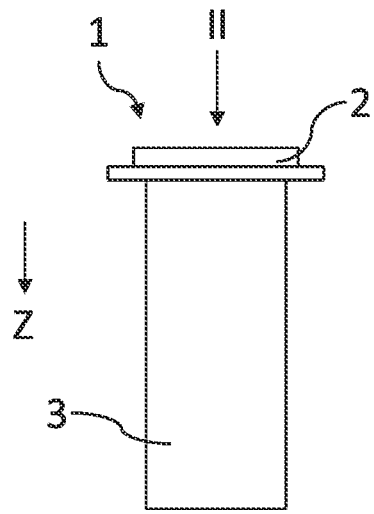
FIG. 1 shows a first embodiment of a fastening means having a blind rivet element and a sealing element in a view as per the arrow I in FIG. 2.
Figure 2:
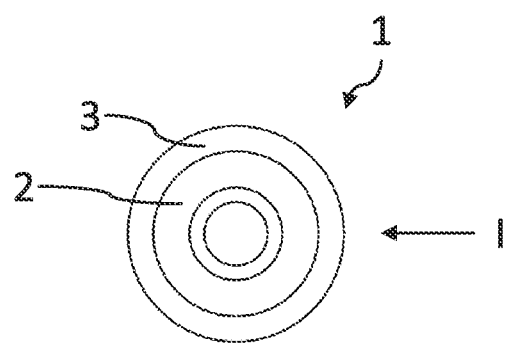
FIG. 2 shows the fastening means in a view as per the arrow II in FIG. 1.
Figure 3:
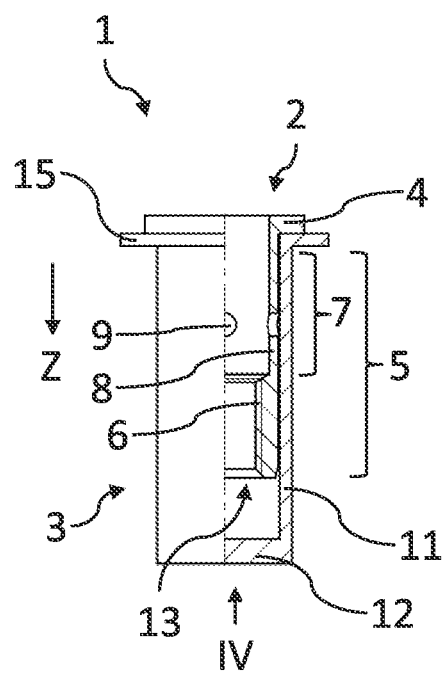
FIG. 3 shows the fastening means in a sectional view as per the line III-Ill in FIG. 4.
Figure 4:
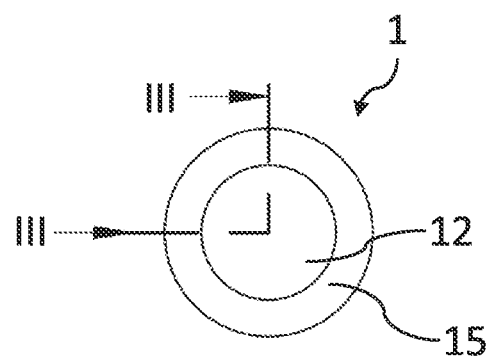
FIG. 4 shows the fastening means in a view as per the arrow IV in FIG. 3.
Figure 5:
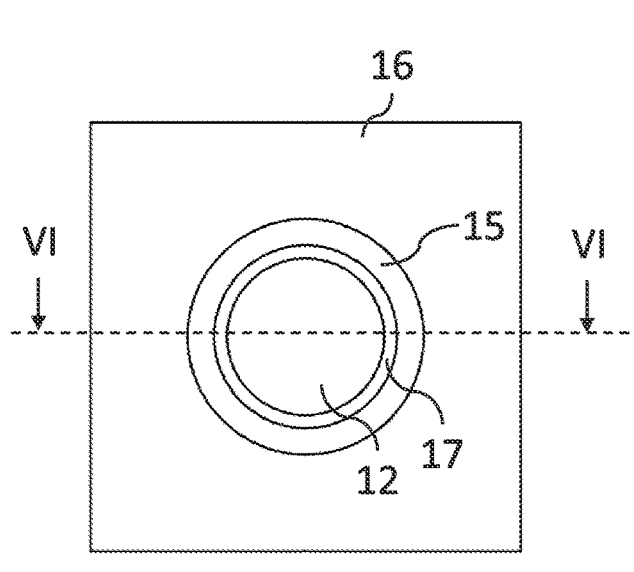
FIG. 5 shows an arrangement of a deformed fastening means as per FIG. 1 and of a component in a view as per the arrow V in FIG. 6.
Figure 6:
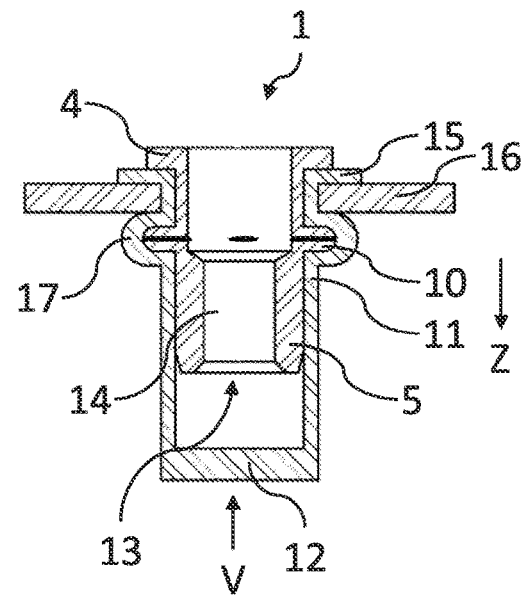
FIG. 6 shows the arrangement as per FIG. 5 in a sectional view as per the line VI-VI.

FIGS. 1 to 6 show a first embodiment of a fastening means 1 having a blind rivet element 2 configured in the form of a blind rivet nut and a sealing element 3, wherein the blind rivet element 2 has a head portion 4 and a shaft 5 adjoining the head portion 4 in an axial direction Z. The shaft 5 has an internal thread 6 and, between the internal thread 6 and the head portion 4, a deformation portion 7. In the present case, the deformation portion 7 is formed such that a wall 8 of the shaft 5 in the region of the deformation portion 7 has a weakening in the form of four holes 9. The deformation portion 7 is used to form a closing head 10 (see FIG. 6) when the deformation portion 7 is deformed. In FIGS. 1 to 4 and 7, the blind rivet element 2 is in a non-deformed state, and thus in a state prior to setting of the blind rivet element 2.

In the present case, the sealing element 3 is pot-shaped, namely is configured in the form of a hollow cylinder which is closed on one side, wherein the sealing element 3 has a closed lateral portion 11 and a closed cover portion 12 adjoining the lateral portion 11 in the axial direction Z. In the present case, the lateral portion 11 extends up to the head portion 4 and circumferentially encloses the shaft 5 of the blind rivet element 2 and in particular bears circumferentially against the shaft 5. The cover portion 12 is formed at an end 13 of the shaft 5 of the blind rivet element 2, said end facing away from the head portion 4. For the purpose of providing a thread in a component 16, the fastening means 1 is introduced into a prefabricated receiving opening of the component 16 and the deformation portion 7 is subsequently deformed in order to form the closing head 10. As can be seen in particular in FIG. 6, which shows an arrangement of the fastening means 1 and of the component 16, during the formation of the closing head 10 of the blind rivet element 2, the lateral portion 11 of the sealing element 3 is deformed in such a way that the lateral portion 11 maintains its closed structure, with formation of a bead 17.

On account of the sealing element 3, after deformation of the blind rivet element 2, a first side, which is assigned to the head portion 4 of the blind rivet element 2, of the component 16, into which the fastening means 1 is introduced, is separated in a fluid-tight manner from a second side of the component 16, said second side facing away from the first side of the component 16 and being assigned to the closing head 10. In this respect, it is not possible for fluid to flow from the first side of the component 16 in the direction of the second side of the component 16, and vice versa, through the receiving opening into which the fastening means 1 is introduced. As can be seen in particular in FIG. 6, the blind rivet element 2 is also separated from the environment or atmosphere which prevails on the second side of the component 16, or is not exposed to said atmosphere or environment, as a result of the sealing element 3. By way of example, the second side could be an inner side of a tank in which a liquid or a gas is stored. As a result of the fact that the sealing element 3 seals off the blind rivet element 2 in relation to the environment prevailing on the second side of the component 16, a fastening means, for example a screw, which is introduced into the blind rivet element 2 is also sealed off in relation to said environment.

In the present case, the blind rivet element 2 has a passage opening 14 which passes through the blind rivet element 2 in the axial direction Z. In this respect, the blind rivet element 2 makes it possible, for example, for a screw which is introduced into the blind rivet element 2 or a setting mandrel to axially pass through the blind rivet element 2 and, in this respect, to protrude in relation to the end 13 of the shaft 5 in the axial direction Z. As a result of the fact that the cover portion 12 of the sealing element 3 and that end 13 of the shaft 5 which faces away from the head portion 4 are spaced apart in the axial direction Z, it is possible for the screw which is introduced into the blind rivet element 2 or the setting mandrel to protrude in the axial direction Z in relation to the end 13, without the cover portion 12 being damaged during the introduction of the screw or of the setting mandrel.

Figure 7:
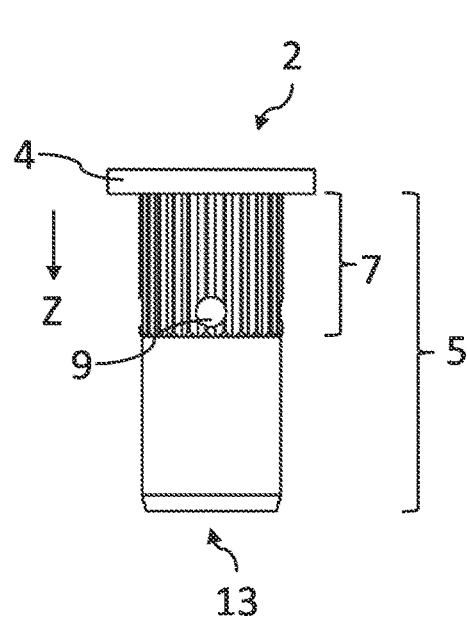
FIG. 7 shows the blind rivet element of the fastening means as per FIG. 1 in a side view.
Figure 8:
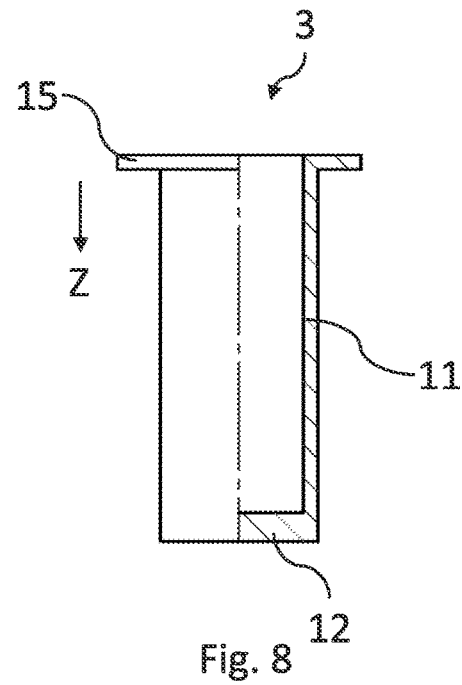
FIG. 8 shows the sealing element of the fastening means as per FIG. 1 in a partially sectioned illustration.

The sealing element 3 has, at its end which faces away from the cover portion 12, a circumferential projection 15 which protrudes radially outwardly in relation to the lateral portion 11, wherein the projection 15 protrudes radially outwardly in relation to the head portion 4. The blind rivet element 2 and the sealing element 3 can form entirely separate components, as is illustrated in FIGS. 7 and 8.

Figure 9:
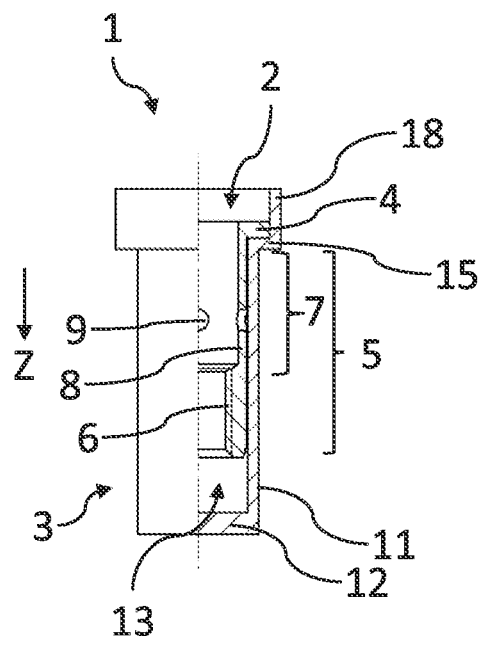
FIG. 9 shows a second embodiment of the fastening means having a blind rivet element and a sealing element in a partially sectioned illustration.
Figure 10:
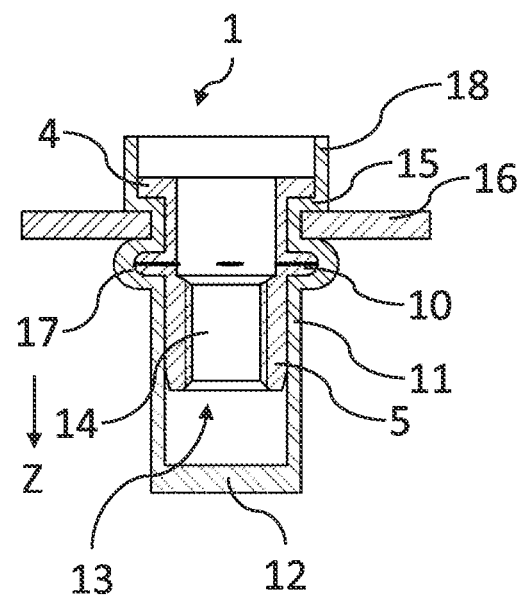
FIG. 10 shows an arrangement of a deformed fastening means as per FIG. 9 and of a component in a sectional view.
Figure 11:
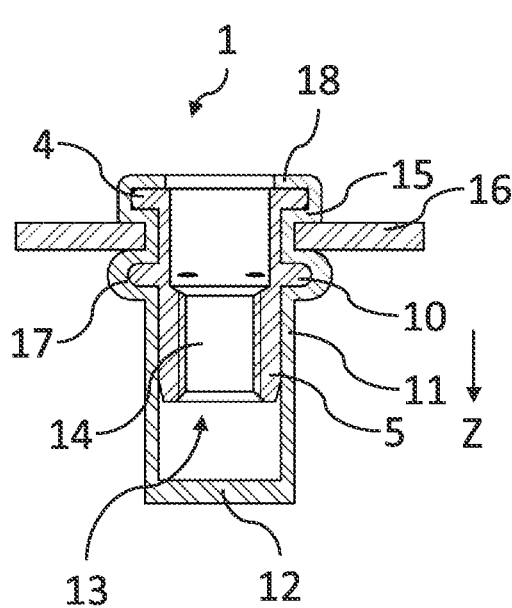
FIG. 11 shows the arrangement as per FIG. 10 with a deformed partial portion of a further lateral portion.
Figure 12:
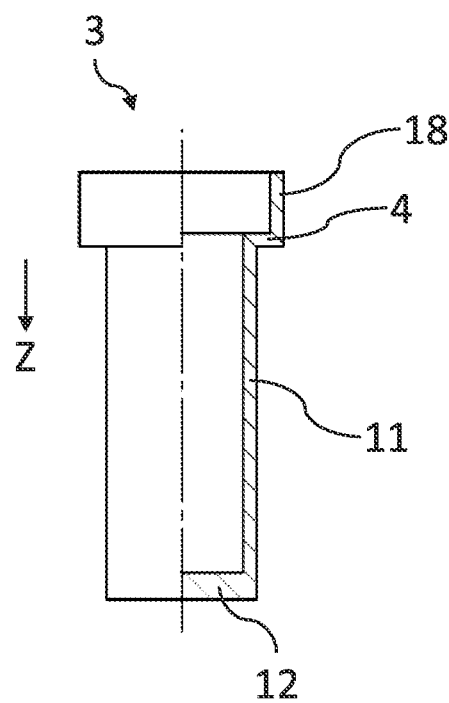
FIG. 12 shows the sealing element of the fastening means as per FIG. 9 in a partially sectioned illustration.

FIGS. 9 to 11 show a second embodiment of a fastening means 1. This second exemplary embodiment differs from the first exemplary embodiment of the fastening means 1 substantially by the design of the sealing element 3, which has a further lateral portion 18, wherein the further lateral portion 18 circumferentially encloses the head portion 4 of the blind rivet element 2, and a partial region of the lateral portion 18 protrudes counter to the axial direction Z in relation to the head portion 4. That partial region of the further lateral portion 18 which protrudes counter to the axial direction Z is radially inwardly deformable such that said partial region radially inwardly covers the head portion 4 in the axial direction Z after the deformation, as is shown in FIG. 11. In the present case, the partial region is deformed in a separate method step after the setting of the blind rivet element 2, as shown by a comparison of FIGS. 10 and 11.

Figure 13:
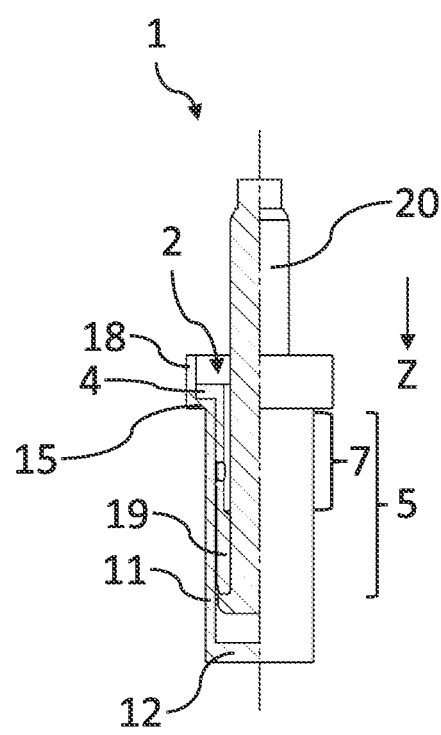
FIG. 13 shows a third embodiment of the fastening means having a blind rivet element and a sealing element in a partially sectioned illustration.
Figure 14:
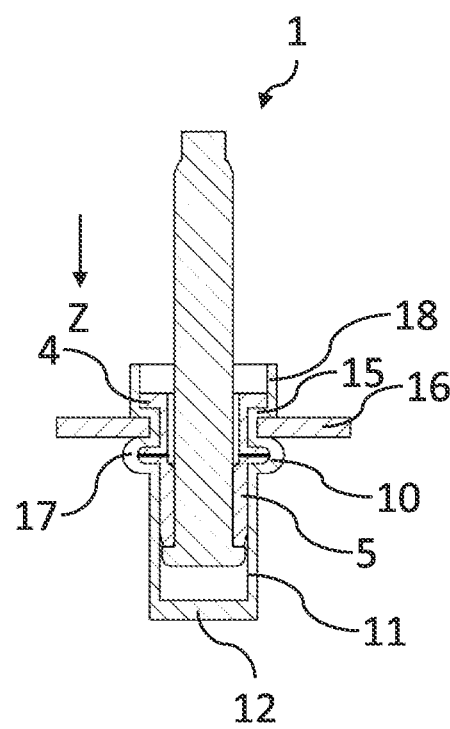
FIG. 14 shows an arrangement of a deformed fastening means as per FIG. 13 and of a component in a sectional view.

FIGS. 13 and 14 show a third embodiment of the fastening means 1, wherein this third exemplary embodiment differs from the second exemplary embodiment of the fastening means 1 substantially by the design of the blind rivet element 2, which, in the present case, is configured in the form of a blind rivet threaded bolt, inasmuch as the shaft 5 has a connecting portion 19 for a threaded bolt 20.

That which is claimed is:

1. A fastener comprising a blind rivet element and a sealing element, the blind rivet element having a head portion and a shaft adjoining the head portion in an axial direction, the shaft having an internal thread for a threaded bolt and a deformation portion that forms a closing head as a result of a deformation of the deformation portion, the deformation portion being located between the internal thread for the threaded bolt and the head portion, wherein the sealing element has a closed lateral portion and a closed cover portion adjoining the lateral portion in the axial direction, wherein the lateral portion circumferentially encloses the shaft of the blind rivet element at least in a region of the deformation portion and the cover portion is formed at an end of the shaft of the blind rivet element facing away from the head portion, wherein the cover portion of the sealing element and the end of the shaft of the blind rivet element facing away from the head portion are spaced apart in the axial direction, wherein the distance between the cover portion of the sealing element and the end of the shaft of the blind rivet element facing away from the head portion is at least 1.0 times the pitch of the internal thread for the threaded bolt, and wherein the sealing element has a further lateral portion which circumferentially encloses the head portion of the blind rivet element and a partial region of the further lateral portion protrudes in relation to the head portion away from the cover portion in the axial direction.

2. The fastener as claimed in claim 1, wherein the sealing element is configured in the form of a hollow cylinder which is closed on one end.

3. The fastener as claimed in claim 1, wherein, as a result of the deformation of the deformation portion that forms the closing head, the lateral portion of the sealing element is deformed while maintaining a closed configuration.

4. The fastener as claimed in claim 3, wherein the deformation portion of the blind rivet element that forms the closing head and the lateral portion of the sealing element are deformed radially outwardly, but the internal thread remains undeformed.

5. The fastener as claimed in claim 1, wherein the blind rivet element is manufactured from a metal and the sealing element is manufactured from a plastic.

6. The fastener as claimed in claim 1, wherein the blind rivet element has a passage opening which passes through the blind rivet element in the axial direction.

7. The fastener as claimed in claim 1, wherein the lateral portion extends up to the head portion.

8. The fastener as claimed in claim 1, wherein the sealing element has a circumferential projection which protrudes radially outwardly in relation to the lateral portion between the head portion and the deformation portion.

9. The fastener as claimed in claim 1, wherein the sealing element and the blind rivet element are connected to one another in a non-releasable manner.

10. The fastener as claimed in claim 9, wherein the sealing element is injection-molded onto the blind rivet element.

11. The fastener as claimed in claim 9, wherein the sealing element and the blind rivet element are connected to one another in a materially bonded manner.

12. The fastener as claimed in claim 1, wherein the sealing element is connected to the blind rivet element in a releasable manner.

13. The fastener as claimed in 12, wherein the sealing element and the blind rivet element are connected to one another in a force-fitting manner.

14. The fastener as claimed in claim 1, wherein the blind rivet element and the sealing element form separate components.

15. The fastener as claimed in claim 1, wherein the sealing element is manufactured from a polymer.

16. The fastener as claimed in claim 1, wherein the distance between the cover portion and the end of the shaft is 2.0 to 3.0 times the pitch of the internal thread.

17. The fastener as claimed in claim 1, wherein the partial region of the further lateral portion of the sealing element is radially inwardly deformable such that the partial region radially inwardly covers the head portion in the axial direction after deformation of the partial region.

18. The fastener as claimed in claim 15, wherein the sealing element is manufactured from a thermoplastic polymer.

* * * * *